US008005668B2

(12) United States Patent
Arun

(10) Patent No.: US 8,005,668 B2
(45) Date of Patent: Aug. 23, 2011

(54) ADAPTIVE CONFIDENCE THRESHOLDS IN TELEMATICS SYSTEM SPEECH RECOGNITION

(75) Inventor: Uma Arun, Novi, MI (US)

(73) Assignee: General Motors LLC, Detroit, MI (US)

( * ) Notice: Subject to any disclaimer, the term of this patent is extended or adjusted under 35 U.S.C. 154(b) by 1161 days.

(21) Appl. No.: 10/946,887

(22) Filed: Sep. 22, 2004

(65) Prior Publication Data

US 2006/0074651 A1    Apr. 6, 2006

(51) Int. Cl.
*G10L 21/02* (2006.01)
(52) U.S. Cl. ........................................ 704/226
(58) Field of Classification Search .................. 704/226
See application file for complete search history.

(56) References Cited

U.S. PATENT DOCUMENTS

| | | | |
|---|---|---|---|
| 4,731,811 A | 3/1988 | Dubus | |
| 4,776,016 A | 10/1988 | Hansen | |
| 5,476,010 A | 12/1995 | Fleming et al. | |
| 5,805,672 A | 9/1998 | Barkat et al. | |
| 5,832,440 A | 11/1998 | Woodbridge | |
| 5,983,186 A * | 11/1999 | Miyazawa et al. | 704/275 |
| 6,112,103 A | 8/2000 | Puthuff | |
| 6,256,611 B1 | 7/2001 | Ali-Yrkko | |
| 6,289,140 B1 | 9/2001 | Oliver | |
| 6,411,928 B2 * | 6/2002 | Tsurufuji et al. | 704/233 |
| 6,587,824 B1 | 7/2003 | Everhart et al. | |
| 6,735,632 B1 | 5/2004 | Kirlay et al. | |
| 6,804,806 B1 | 10/2004 | Bansal | |
| 7,165,027 B2 * | 1/2007 | Kellner et al. | 704/233 |
| 7,212,966 B2 * | 5/2007 | Kyomitsu | 704/233 |
| 7,228,275 B1 * | 6/2007 | Endo et al. | 704/235 |
| 2002/0173955 A1 * | 11/2002 | Reich | 704/231 |
| 2003/0083873 A1 | 5/2003 | Ross et al. | |
| 2003/0120493 A1 | 6/2003 | Gupta | |
| 2003/0189603 A1 * | 10/2003 | Goyal et al. | 345/863 |
| 2003/0220797 A1 * | 11/2003 | Ito | 704/275 |
| 2004/0020700 A1 * | 2/2004 | Watson et al. | 180/247 |
| 2004/0051642 A1 * | 3/2004 | Choi | 340/575 |
| 2004/0199388 A1 * | 10/2004 | Armbruster et al. | 704/251 |
| 2004/0260547 A1 * | 12/2004 | Cohen et al. | 704/275 |
| 2005/0049854 A1 * | 3/2005 | Reding et al. | 704/201 |
| 2005/0171775 A1 * | 8/2005 | Doyle | 704/250 |
| 2005/0177376 A1 * | 8/2005 | Cooper et al. | 704/277 |

OTHER PUBLICATIONS

U.S. Appl. No. 10/444,270, filed May 23, 2003, Arun.

* cited by examiner

*Primary Examiner* — Jakieda R Jackson
(74) *Attorney, Agent, or Firm* — Anthony L. Simon; Reising Ethington P.C.

(57) ABSTRACT

A method of configuring a speech recognition unit in a vehicle. The method includes receiving a noise error from the speech recognition unit responsive to a user voice command and reducing a confidence threshold for an appropriate grammar set responsive to the received noise error.

17 Claims, 5 Drawing Sheets

ADAPTIVE CONFIDENCE THRESHOLDS IN TELEMATICS SYSTEM SPEECH RECOGNITION

FIELD OF THE INVENTION

This invention relates generally to a telematics system speech recognition system. In particular, the invention relates to a method, system and computer usable medium for dynamically adapting the confidence thresholds for speech recognition in a mobile vehicle.

BACKGROUND OF THE INVENTION

The opportunity to personalize features in a mobile vehicle is ever increasing as the automobile is being transformed into a communications and entertainment platform as well as a transportation platform. Many new American cars will be installed with some type of telematics unit to provide wireless communication and location-based services. These services may be accessed through interfaces such as voice-recognition computer applications, touch-screen computer displays, computer keyboards, or a series of buttons on the dashboard or console of a vehicle.

Currently, telematics service call centers, in-vehicle compact disk (CD) or digital video display (DVD) media, web portals, and voice-enabled phone portals provide various types of location services, including driving directions, stolen vehicle tracking, traffic information, weather reports, restaurant guides, ski reports, road condition information, accident updates, street routing, landmark guides, and business finders.

For example, traffic and driving directions may be accessed through a voice portal that uses incoming number identification to generate location information based on the area code or prefix of the phone number, or to access location information stored in a user's profile associated with the phone number. Users may be prompted to enter more details through a voice interface.

Speech recognition systems are used within vehicles with telematics units for various functions. The speech recognition unit receives, recognizes and generates responses to commands, such as "Call," "Dial," "Locate," and "Generate map."

Confidence thresholds are preset in the voice-recognition application software that is installed in the telematics unit. The confidence threshold establishes the minimum acceptable confidence that a spoken word or sentence is correlated with a stored vocabulary in the system. The optimum confidence threshold is set after testing utterances from many people with different dialects under different noise level conditions to obtain statistically significant threshold levels. Different optimum threshold values may be set for different grammar sets to be applicable uniformly across all noise conditions and dialects. The grammar set is associated with a command function and includes all the words that are likely to be uttered during a speech task related to that command function.

Since the optimum threshold values are statistical, they do not meet the needs of everyone in different noise conditions. The threshold values, which are sufficient in low noise conditions, are sometimes inadequate in high noise conditions for a user. The threshold values are sometimes inadequate based on the volume of a particular user. In that case, the speech recognition system is unable, with a confidence greater than the default confidence threshold level, to correlate a spoken phrase with the stored phrases in the speech recognition system. When the user voice command is not recognized because of a low signal-to-noise ratio, the telematics unit advises the user to reduce the ambient noise level. If the user is able to reduce the noise level in the car, for example, by rolling up the vehicle windows, the voice-recognition application may recognize the voice command that is repeated after the noise is reduced. If the voice-recognition application is unable to recognize the command after several attempts, the speech recognition session ends with an unrecognized-command error. The telematics unit advises the user that the voice command was unrecognized. In this case, the user contacts an advisor to provide the desired service.

It is desirable to adjust the confidence threshold level during a speech recognition session, if the signal to noise level prevents the spoken command from being recognized within the default confidence threshold level. It is further desirable to reset to the default confidence threshold level after the vehicle is turned off.

SUMMARY OF THE INVENTION

One aspect of the present invention provides a method of configuring a speech recognition unit in a vehicle. The method includes receiving a noise error from the speech recognition unit responsive to a user voice command and reducing a confidence threshold for an appropriate grammar set responsive to the received noise error.

Another aspect of the present invention provides a system for configuring a speech recognition unit in a vehicle. The system includes means for receiving a noise error from the speech recognition unit responsive to a user voice command and means for reducing a confidence threshold for an appropriate grammar set responsive to the received noise error.

A third aspect of the present invention provides a computer readable medium storing a computer program which includes computer readable code for receiving a noise error from the speech recognition unit responsive to a user voice command and for reducing a confidence threshold for an appropriate grammar set responsive to the received noise error.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

Various embodiments of the present invention are illustrated by the accompanying figures, wherein.

DETAILED DESCRIPTION OF THE PRESENTLY PREFERRED EMBODIMENTS

Figure 1:
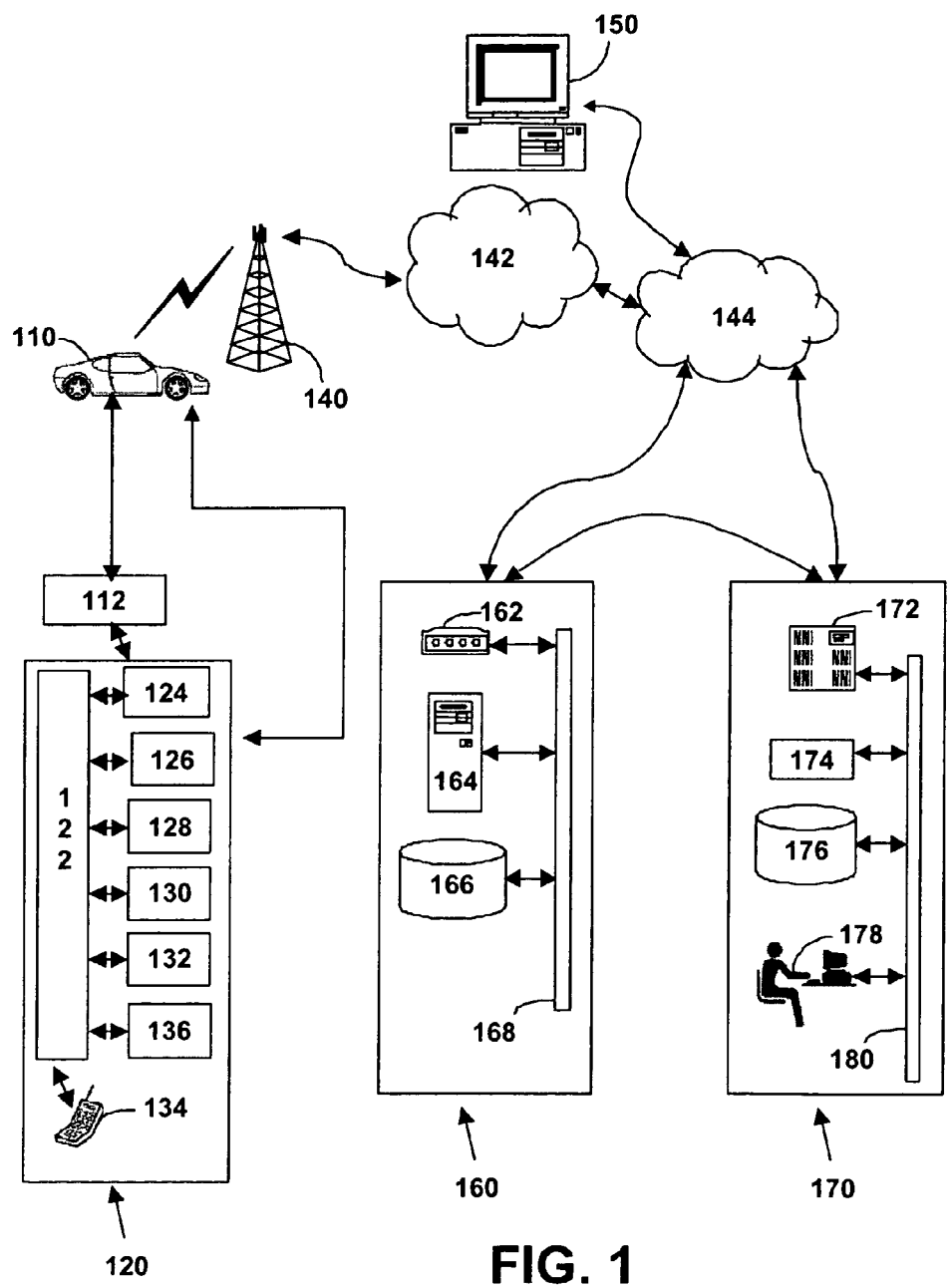
FIG. 1 is a schematic diagram of a system for providing access to a telematics system in a mobile vehicle.

FIG. 1 illustrates one embodiment of system for data transmission over a wireless communication system, in accordance with the present invention at 100. Mobile vehicle communication system (MVCS) 100 includes a mobile vehicle communication unit (MVCU) 110, a vehicle communication network 112, a telematics unit 120, one or more wireless carrier systems 140, one or more communication networks 142, one or more land networks 144, one or more client, personal or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 may also be referred to as a mobile vehicle throughout the discussion below. In operation, MVCU 110 may be implemented as a motor vehicle, a marine vehicle, or as an aircraft. MVCU 110 may include additional components not relevant to the present discussion.

Vehicle communication network 112 sends signals to various units of equipment and systems (detailed below) within MVCU 110 to perform various functions such as unlocking a door, opening the trunk, setting personal comfort settings, and calling from telematics unit 120. In facilitating interactions among the various communication and electronic modules, vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications.

MVCU 110, via telematics unit 120, sends and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS) unit 126, an in-vehicle memory 128, a microphone 130, one or more speakers 132, and an embedded or in-vehicle mobile phone 134. In other embodiments, telematics unit 120 may be implemented without one or more of the above listed components, such as, for example GPS unit 126 or speakers 132. Telematics unit 120 may include additional components not relevant to the present discussion.

In one embodiment, processor 122 is a digital signal processor (DSP). Processor 122 is implemented as a microcontroller, microprocessor, controller, host processor, or vehicle communications processor. In an example, processor 122 is implemented as an application specific integrated circuit (ASIC). In another embodiment, processor 122 is implemented as a processor working in conjunction with a central processing unit (CPU) performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone, such as, for example an analog, digital, dual-mode, dual-band, multi-mode or multi-band cellular phone.

Processor 122 executes various computer programs that control programming and operational modes of electronic and mechanical systems within MVCU 110. Processor 122 controls communications (e.g. call signals) between telematics unit 120, wireless carrier system 140, and call center 170. Processor 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers.

A voice-recognition application is installed in a speech recognition unit 136. Human voice input through microphone 130 is translated into digital signals by processor 122. The speech recognition unit 136 recognizes the translated digital signals to be words or phrases, which represent commands or words in a grammar set related to the command. Instructions associated with the recognized words are transmitted from the speech recognition unit 136 to the processor 122, which activates the instructions. In one embodiment, the speech recognition unit 136 is internal to the processor 122.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal or user computer 150 includes a computer usable medium to execute Internet browser and Internet-access computer programs for sending and receiving data over land network 144 and optionally, wired or wireless communication networks 142 to web-hosting portal 160. Personal or client computer 150 sends user preferences to web-hosting portal through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110. In operation, a client utilizes computer 150 to initiate setting or re-setting of user-preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and from modem 162, data that is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations and theft alarm settings. For each client, the web server potentially stores hundreds of preferences for wireless vehicle communication, networking, maintenance and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services, including enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g. a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicate with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

Figure 2:
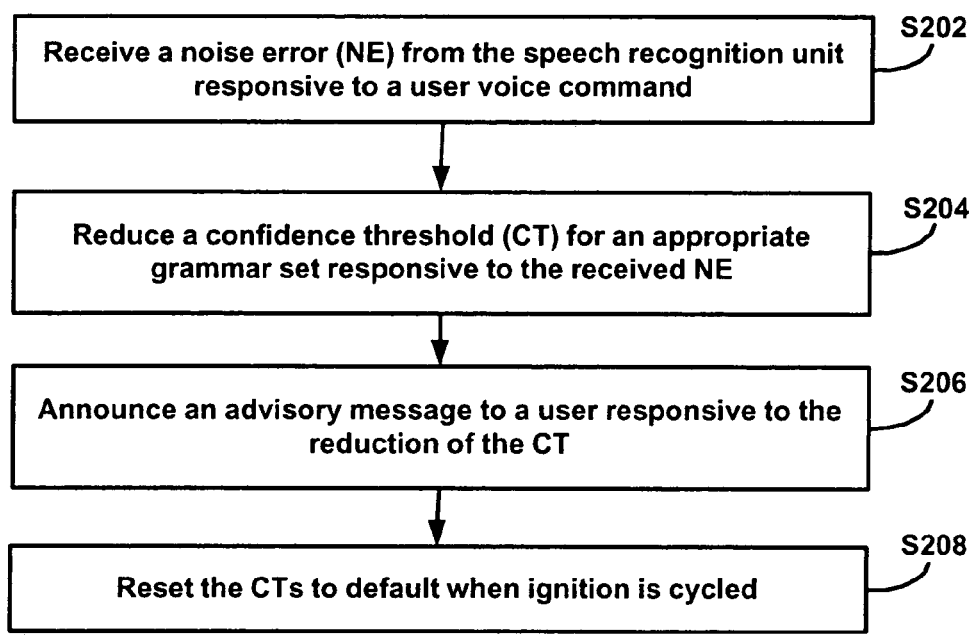
FIG. 2 illustrates a flowchart representative of a first embodiment of a method of configuring a speech recognition unit in a vehicle in accordance with the present invention.

FIG. 2 illustrates a flowchart 200 representative of a first embodiment of a method of configuring a speech recognition unit 136 in a MVCU 110 in accordance with the present invention. During stage S202, the telematics unit 120 receives a noise error (NE) from the speech recognition unit 136 responsive to an unrecognized user voice command. The user voice command received by microphone 130 is translated into digital signals by processor 122. The processor 122 transmits the digital signal to the speech recognition unit 136. The speech recognition unit 136 attempts to match the translated digital signals with digital signals for words stored in the speech recognition unit 136.

The digital signals for words stored in the speech recognition unit 136 are acoustic models. Grammar sets are associated with commands. Acoustic models include digital signals for words that are likely to be uttered during a speech task related to the command. In one embodiment, for example, a dial-command grammar set includes a representation for the word 'dial,' the words for all the numbers from zero to ninety-nine and the letter 'O.'

If the speech recognition unit 136 matches the translated digital signals with stored digital signals for words, the user voice command is recognized. If the signal to noise ratio is too low for a match to be made with a preset confidence threshold, a noise error is generated. A computer readable medium storing a computer program within the speech recognition unit 136 is programmed with computer readable code to attempt to match digital signals, to generate a noise error and to transmit the noise error to the processor 122 in the telematics unit 120.

During stage S204, the telematics unit 120 reduces a confidence threshold (CT) for an appropriate grammar set responsive to the noise error (NE) received at the processor 122. A computer readable medium storing a computer program within the processor 122 is programmed with computer readable code to send a reduce-confidence-threshold instruction to the speech recognition unit 136. The speech recognition unit 136 then reduces the confidence threshold by a preset amount. The preset amount is stored in the speech recognition unit 136. In one embodiment, the preset amount is reduced incrementally. For example, the preset amount may be reduced a predetermined percentage of the range of the confidence threshold. The predetermined percentage is calculated in response to at least one factor. Factors include dialect, region, energy levels present in the spoken utterance, volume, history of spoken utterances by a particular user.

In some embodiments, the original command is unrecognized by the speech recognition unit 136 so the confidence level is reduced for all the grammar sets in the speech recognition unit 136. In another embodiment, the confidence level is reduced for a specific command-grammar-set, which includes all the words and phrases to initiate a command within the telematics unit 120. In one embodiment, a specific command-grammar-set applies to number grammar for dialing numbers, and confidence level is reduced for the specific number grammar.

An exemplary method of reducing the confidence threshold for an appropriate grammar set responsive to the received noise error is described below with reference to flowchart 300 in FIG. 3.

During stage S206, the telematics unit 120 announces an unrecognized-command message to a user responsive to the reduction of the confidence threshold (CT). The computer readable medium storing a computer program within the processor 122 is programmed with computer readable code to generate an advisory message when the instruction to reduce-confidence-threshold is sent to the speech recognition unit 136. The advisory message is a digital signal that is transmitted as spoken words via speakers 132 so the user is prompted to repeat the voice command. In one embodiment, the advisory message indicates the source of reduced confidence, such as "too much noise."

The speech recognition unit 136 now has a higher probability of recognizing the user voice command since the confidence threshold is lower. In one embodiment, given the reduced confidence threshold, the speech recognition unit 136 will now find more than one possible match to the repeated user voice command. In this case, the telematics unit 120 prompts the user to determine which voice command the user actually stated. For example, the telematics unit 120 announces, "Did you say Call Mom?" If the user did not say "Call Mom," the user says, "No." Then the telematics unit 120 announces, "Did you say Call Tom?" and the user says, "Yes." The telematics unit 120 then initiates a call to Tom in accordance with the user voice command.

During stage S208, the telematics unit 120 resets the confidence thresholds (CTs) to default when ignition is cycled, that is, when the MVCU 110 is turned off. The computer readable medium storing a computer program within the processor 122 is programmed with computer readable code to send a set-confidence-threshold-to-default instruction to the speech recognition unit 136 when the MVCU 110 is turned off. The default confidence threshold is the confidence threshold that was installed in the telematics unit 120 at the factory. In one embodiment, the processor 122 sends a set-confidence-threshold-to-default instruction to the speech recognition unit 136 when the MVCU 110 is turned off and on. In other embodiments, the confidence threshold is stored in the processor 122, which is programmed to set the confidence threshold to the default level when the MVCU 110 is turned off and/or on. In another embodiment, the confidence threshold is set by an advisor at a call center. In another embodiment, the confidence threshold is set by a dealer.

Figure 3:
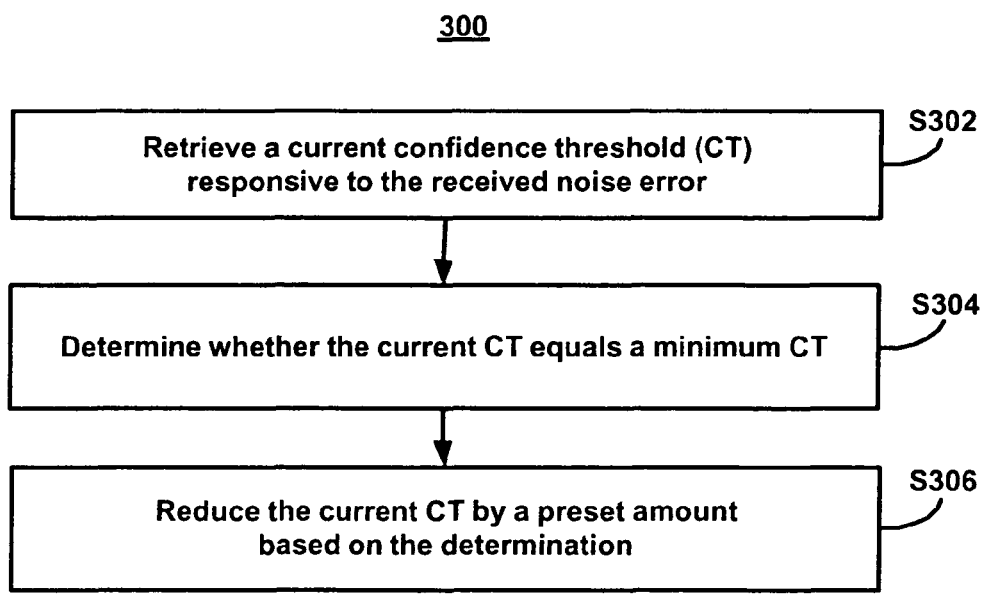
FIG. 3 illustrates a flowchart representative of a first embodiment of a method of reducing a confidence threshold in accordance with the present invention.

FIG. 3 illustrates a flowchart 300 representative of a first embodiment of a method of reducing a confidence threshold in accordance with the present invention. During stage S302, the telematics unit 120 retrieves the current confidence threshold (CT) responsive to a received noise error. The computer readable medium storing a computer program within the processor 122 is programmed with computer readable code to retrieve the current confidence threshold from a memory (not shown) in the speech recognition unit 136 when a noise error is received at the telematics unit 120. In another embodiment, the current confidence threshold is retrieved from the in-vehicle memory 128 in the telematics unit 120.

During stage S304, the telematics unit 120 determines whether the current confidence threshold (CT) equals a minimum confidence threshold (CT). The computer readable medium storing a computer program within the processor 122 is programmed with computer readable code to compare the retrieved current confidence threshold with a minimum confidence threshold to determine if they are equal. The minimum confidence threshold is stored in the telematics unit 120. In one embodiment, the minimum confidence threshold is stored in the in-vehicle memory 128 in the telematics unit 120.

In another embodiment, the speech recognition unit 136 compares the current confidence threshold stored in the speech recognition unit 136 with a minimum confidence threshold. In this embodiment, the minimum confidence threshold is stored in a memory (not shown) in the speech recognition unit 136.

During stage S306, the telematics unit 120 reduces the current confidence threshold (CT) by a preset amount based on the determination made during stage S304. If the current confidence threshold does not equal the minimum confidence threshold, the computer readable medium storing a computer program within the processor 122 is programmed with computer readable code to send a reduce-confidence-threshold instruction to the speech recognition unit 136. The speech recognition unit 136 contains computer readable code to subtract the preset amount from the current confidence threshold in response to the instruction to reduce the confidence threshold. The preset amount is stored in a memory (not shown) within the speech recognition unit 136. Then the speech recognition unit 136 uses the reduced confidence threshold in the process of recognizing the next user voice command received by the telematics unit 120, as described above with reference to stage S202 in flowchart 200 in FIG. 2.

In one embodiment, the processor 122 retrieves the preset amount from in-vehicle memory 128 and sends a reduce-confidence-threshold instruction along with the retrieved preset amount, to the speech recognition unit 136. In another embodiment, the processor 122 subtracts the preset amount from the current confidence threshold and transmits the reduced confidence threshold to the speech recognition unit 136. In one embodiment, the preset amount, by which the confidence threshold is reduced, is a percentage of the current confidence threshold.

If the current confidence threshold equals the minimum confidence threshold, the current confidence threshold is not reduced. In that case, the telematics unit 120 announces an unrecognized command message to the user.

Figure 4:
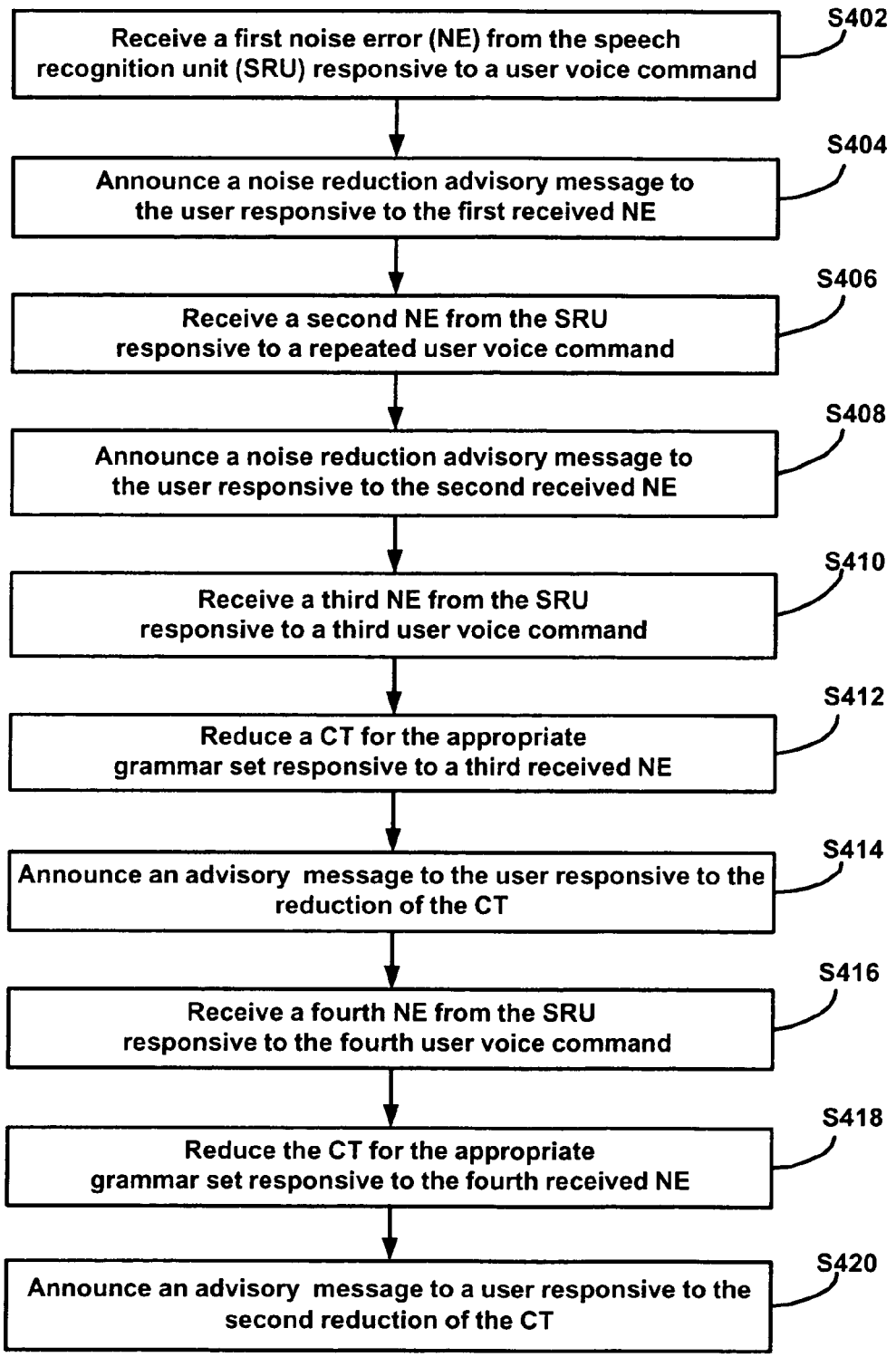
FIG. 4 illustrates a flowchart representative of a second embodiment of a method of configuring a speech recognition unit in a vehicle in accordance with the present invention.

FIG. 4 illustrates a flowchart 400 representative of a second embodiment of a method of configuring a speech recognition unit 136 in an MVCU 110 in accordance with the present invention. Flowchart 400 describes an embodiment in which the confidence threshold is reduced after announcing more than one noise reduction advisory messages to the user during a speech recognition session. In this embodiment, the confidence threshold is reduced by the preset amount two times responsive to at least two respective received noise errors. The user is prompted to repeat the voice-command after each reduction in confidence threshold.

During stage S402, the telematics unit 120 receives a first noise error (NE) from the speech recognition unit (SRU) 136 responsive to a user voice command not being recognized. During stage S404, the telematics unit 120 announces a noise reduction advisory message to a user responsive to the received noise error (NE) to prompt the user to repeat the voice command. The noise reduction advisory message asks the user to reduce the noise level in the MVCU 110, prior to repeating the voice command. In some embodiments, the user is able to reduce some ambient noise in the MVCU 110. In other embodiments, the noise is external to the MVCU 110 and the user cannot reduce the noise level in the MVCU 110. The user repeats the voice command. The speech recognition unit 136 attempts to recognize the user voice command. If the user voice command is not recognized, the speech recognition unit 136 transmits a second noise error to the telematics unit 120.

During stage S406, the telematics unit 120 receives a second noise error (NE) from the speech recognition unit (SRU) 136 responsive to the repeated user voice command not being recognized by the speech recognition unit 136. During stage S408, the telematics unit 120 announces the noise reduction advisory message to the user responsive to the second received noise error (NE) to prompt the user to repeat the voice command for a third time. The user announces the voice command for the third time. The speech recognition unit 136 attempts to recognize the third user voice command. If the third user voice command is not recognized, the speech recognition transmits a third noise error to the telematics unit 120.

If the third announced user voice command is recognized, the telematics unit 120 provides the requested service. In this case, the speech recognition unit 136 transmits an instruction associated with the recognized command to the telematics unit 120 or continues the dialog.

During stage S410, the telematics unit 120 receives the third noise error (NE) from the speech recognition unit (SRU) 136 responsive to the third user voice command not being recognized. During stage S412, the telematics unit 120 reduces a current confidence threshold (CT) for an appropriate grammar set responsive to the third received noise error received during stage S410. The method of reducing a confidence threshold proceeds as described above with reference to flowchart 300 in FIG. 3.

During stage S414, the telematics unit 120 announces the unrecognized-command message to the user responsive to the reduction of the confidence threshold (CT). The unrecognized-command message prompts the user to announce the voice command for the fourth time. The user announces the voice command for the fourth time. The speech recognition unit 136 attempts to recognize the fourth user voice command. If the fourth user voice command is not recognized, the speech recognition transmits a fourth noise error to the telematics unit 120. If the fourth user voice command is recognized, the telematics unit 120 provides the requested service.

During stage S416, the telematics unit 120 receives a fourth noise error (NE) from the speech recognition unit (SRU) 136 responsive to the fourth user voice command not being recognized. During stage S418, the telematics unit 120 reduces the confidence threshold (CT) for the appropriate grammar set responsive to the fourth received noise error (NE). During stage S420, the telematics unit 120 announces an advisory message to a user responsive to the second reduction of the confidence threshold. The advisory message prompts the user to announce the voice command for the fifth time.

The flow can proceed in like manner with the telematics unit 120 going through cycles of receiving user voice commands, attempting to recognize the user voice commands, receiving noise errors, reducing the confidence threshold and prompting the user to repeat the voice command until one of three events occur.

The first event to stop the cycle occurs when the speech recognition unit 136 recognizes the user voice command and the telematics unit 120 provides the requested service. The second event to stop the cycle occurs when the minimum confidence threshold is reached before the speech recognition session recognized the user voice command. The third event to stop the cycle occurs when the recognition is not successful after a predetermined number of attempts, such as 5. In this case, the telematics unit 120 announces a message to the user that the speech recognition session is terminated. In one embodiment, the telematics unit 120 announces, "The command is not recognized. Please try again."

Figure 5:
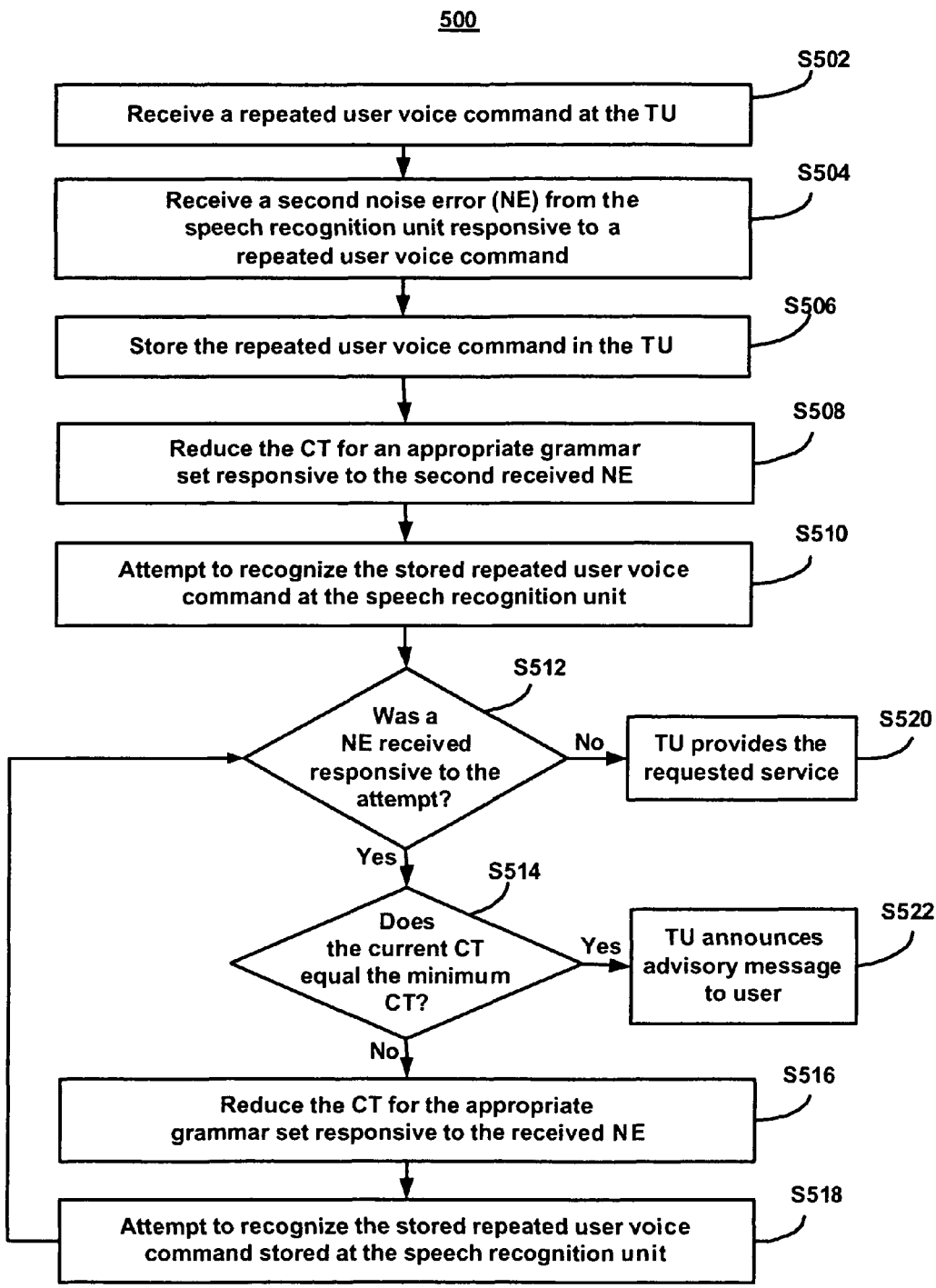
FIG. 5 illustrates a flowchart representative of a third embodiment of a method of configuring a speech recognition unit in a vehicle in accordance with the present invention.

FIG. 5 illustrates a flowchart 500 representative of a third embodiment of a method of configuring a speech recognition unit 136 in a MVCU 110 in accordance with the present invention. In this embodiment, unlike the second embodiment described with reference to flowchart 400 in FIG. 4, the user is only prompted to repeat the message once. The flowchart 500 begins at a point that follows the stages of S402 and S404 in flowchart 400 in FIG. 4.

During stage S502, the telematics unit (TU) 120 receives a repeated user voice command. During stage S504, the telematics unit 120 receives a second noise error (NE) from the speech recognition unit 136 responsive to the repeated user voice command not being recognized by the speech recognition unit 136. During stage S506, the repeated user voice command is stored in the telematics unit (TU) 120. The repeated user voice command is received by microphone 130 and translated into digital signals by processor 122. In one embodiment, the digital signals of the repeated user voice command are temporarily stored in a memory (not shown) in the speech recognition unit 136. In another embodiment, the digital signals of the repeated user voice command are temporarily stored in the in-vehicle memory 128 in the telematics unit 120. The digital signals of the repeated user voice command are deleted from memory when the speech recognition session is terminated.

During stage S508, the confidence threshold (CT) is reduced for an appropriate grammar set responsive to the second received noise error (NE), as described above with reference to flowchart 300 in FIG. 3. During stage S510, the speech recognition unit 136 attempts to recognize the stored repeated user voice command after the confidence threshold is reduced. The speech recognition unit 136 retrieves the temporarily stored digital commands of the repeated user voice command and attempts to match them with digital commands in the appropriate grammar set. The digital signals in the appropriate grammar set are stored in the speech recognition unit 136. If the reduced confidence threshold is still too high for a match, a third noise error is generated by the speech recognition unit 136 and transmitted to the processor 122.

During stage S512, the telematics unit 120 determines if a noise error (NE) was received responsive to the attempt by the speech recognition unit 136 to recognize the stored user voice command. If a noise error was not received, the telematics unit (TU) 120 provides the requested service during stage S520. During stage S520, the speech recognition unit 136 transmits an instruction associated with the recognized command to the telematics unit 120 or continues with the dialog. The telematics unit 120 receives the associated instruction and initiates the process or processes appropriate to respond to the user voice command.

If a noise error was received during stage S512, the telematics unit 120 determines if the current confidence threshold (CT) equals the minimum confidence threshold (CT) during stage S514. If the current confidence threshold equals the minimum confidence threshold, then during stage S522, the telematics unit (TU) 120 announces an advisory message to the user. In this case, the telematics unit 120 announces a message to the user that the speech recognition session is terminated. In one embodiment, the telematics unit 120 announces, "Command not recognized. Please try again."

If the current confidence threshold is greater than the minimum confidence threshold, then during stage S516, the telematics unit (TU) 120 reduces the confidence threshold (CT) for the appropriate grammar set responsive to the received noise error (NE) as described above in reference to stage S306 in flowchart 300 in FIG. 3.

During stage S518, the speech recognition unit 136 attempts to recognize the stored repeated voice command as described above in stage S510. Then the flow returns to stage S512.

Until one of three events occurs, the flowchart 500 cycles through stages S512-S518 without prompting the user to repeat the voice command. The first event to stop the cycle through stages S512-S518 occurs when the speech recognition unit 136 recognizes the user voice command and the telematics unit 120 provides the requested service as described above with reference to stage S520. The second event to stop the cycle through stages S512-S518 occurs when the minimum confidence threshold is reached and the telematics unit 120 announces an unrecognized command to the user as in stage S522. The third events occur after the recognition was not successful.

While the embodiments, of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of configuring a speech recognition unit in a vehicle, the method comprising:
   receiving a noise error from the speech recognition unit responsive to a user voice command; and
   carrying out at least one iteration of the following steps:
   reducing a confidence threshold for an appropriate grammar set responsive to the received noise error; and
   re-attempting speech recognition in the vehicle using the reduced confidence threshold;
   wherein the reducing and re-attempting steps further comprise, during at least one iteration, the steps of storing the voice command prior to the reducing step and then, after the reducing step, attempting speech recognition in the vehicle on the stored voice command using the reduced confidence threshold.

2. The method of claim 1, further comprising:
   announcing an advisory message to a user responsive to the reduction of the confidence threshold.

3. The method of claim 1, wherein reducing a confidence threshold comprises:
   retrieving a current confidence threshold responsive to the received noise error;
   determining whether the current confidence threshold equals a minimum confidence threshold; and
   reducing the current confidence threshold by a preset amount based on the determination.

4. The method of claim 3, wherein the confidence threshold is reduced by the preset amount two or more times responsive to at least two or more respective received noise errors.

5. The method of claim 1, wherein the step of carrying out at least one iteration of the reducing and re-attempting steps further comprises:
   announcing a noise reduction advisory message to a user responsive to the received noise error; and
   receiving a second noise error from the speech recognition unit responsive to a repeated user voice command,
   wherein the repeated user voice command is received following the noise reduction advisory message, and
   wherein the reducing a confidence threshold for an appropriate grammar set is responsive to the received second noise error.

6. The method of claim 5, wherein reducing a confidence threshold is responsive to announcing more than one noise reduction advisory messages during a speech recognition session.

7. The method of claim 5, wherein the step of carrying out at least one iteration of the reducing and re-attempting steps further comprises:
   storing the repeated user voice command in the telematics unit; and
   attempting to recognize the stored repeated user voice command at the speech recognition unit after the confidence threshold is reduced.

8. The method of claim 7, wherein the step of carrying out at least one iteration of the reducing and re-attempting steps further comprises:
   reducing a confidence threshold for the appropriate grammer set responsive to a third received noise error, wherein the third received noise error is responsive to the attempting to recognize the stored user voice command; and
   attempting to recognize the stored repeated user voice command at the speech recognition unit after the confidence threshold is reduced twice.

9. A method of configuring a speech recognition unit in a vehicle, the method comprising:
   receiving a noise error from the speech recognition unit responsive to a user voice command; and
   reducing a confidence threshold for an appropriate grammar set responsive to the received noise error, wherein reducing a confidence threshold comprises:
   retrieving a current confidence threshold responsive to the received noise error;
   determining whether the current confidence threshold equals a predetermined minimum confidence threshold; and reducing the current confidence threshold by a preset amount based on the determination;

wherein the confidence threshold is reduced by the preset amount two or more times responsive to at least two or more respective received noise errors; and wherein the confidence threshold is reduced by the preset amount until the current confidence threshold equals the predetermined minimum confidence threshold.

10. The method of claim 9, wherein the re-attempting step further comprises attempting speech recognition on a voice command stored prior to the preceding reducing step.

11. A method of configuring a speech recognition unit in a vehicle, the method comprising:

receiving a noise error from the speech recognition unit responsive to a user voice command;

reducing a confidence threshold for an appropriate grammar set responsive to the received noise error; and resetting the confidence threshold in response to an ignition event.

12. The system of claim 11, wherein the ignition event comprises the vehicle being turned off.

13. A system for configuring a speech recognition unit in a vehicle, the system comprising:

means for receiving a noise error from the speech recognition unit responsive to a user voice command; and means for iteratively reducing a confidence threshold for an appropriate grammar set responsive to the received noise error and re-attempting speech recognition in the vehicle of a voice command using the reduced confidence threshold, wherein the means for iteratively reducing a confidence threshold and re-attempting speech recognition further comprises means for storing the voice command prior to reducing the confidence threshold and means for attempting speech recognition in the vehicle on the stored voice command using the reduced confidence threshold;

wherein the means for receiving a noise error and the means for iteratively reducing a confidence threshold each comprise a processor that executes computer programming that is stored in memory in the vehicle.

14. The system of claim 13, further comprising:

means for announcing an advisory message to a user responsive to the reduction of the confidence threshold.

15. The system of claim 13, wherein the means for reducing a confidence threshold comprises:

means for retrieving a current confidence threshold responsive to the received noise error;

means for determining whether the current confidence equals a minimum confidence threshold; and means for reducing the current confidence threshold by a preset amount based on the determination.

16. The system of claim 13, wherein the means for iteratively reducing and re-attempting further comprises:

means for storing a repeated user voice command in the telematics unit; and means for attempting to recognize the stored repeated user voice command at the speech recognition unit after the confidence threshold is reduced.

17. A system for configuring a speech recognition unit in a vehicle, the system comprising:

means for receiving a noise error from the speech recognition unit responsive to a user voice command;

means for reducing a confidence threshold for an appropriate grammar set responsive to the received noise error; and means for resetting the confidence threshold in response to an ignition event;

wherein the means for receiving a noise error, the means for reducing a confidence threshold, and the means for resetting the confidence threshold each comprise a processor that executes computer programming that is stored in memory in the vehicle.

* * * * *